United States Patent
Chillariga et al.

(10) Patent No.: US 12,056,364 B1
(45) Date of Patent: Aug. 6, 2024

(54) WRITE BUFFER AND LOGICAL UNIT MANAGEMENT IN A DATA STORAGE DEVICE

(71) Applicant: QUALCOMM Incorporated, San Diego, CA (US)

(72) Inventors: Yogananda Rao Chillariga, Hyderabad (IN); Santhosh Reddy Akavaram, Hyderabad (IN); Prakhar Srivastava, Lucknow (IN); Sonali Jabreva, Firozabad (IN); Chintalapati Bharath Sai Varma, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/296,319

(22) Filed: Apr. 5, 2023

(51) Int. Cl.
*G06F 3/06* (2006.01)

(52) U.S. Cl.
CPC .......... *G06F 3/0613* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 10,929,342 B2* | 2/2021 | Rashid | ............... | G06F 16/122 |
| 2019/0163636 A1* | 5/2019 | Yang | ............... | G06F 12/0223 |
| 2020/0081656 A1 | 3/2020 | Park | | |
| 2021/0223962 A1 | 7/2021 | Esaka et al. | | |
| 2022/0066692 A1* | 3/2022 | Noh | ................. | G06F 3/0679 |
| 2022/0253239 A1 | 8/2022 | Jang et al. | | |
| 2022/0269434 A1* | 8/2022 | Shin | ................. | G06F 3/0631 |
| 2022/0350530 A1* | 11/2022 | Yoshida | ............ | G06F 3/0644 |
| 2023/0120862 A1* | 4/2023 | Gao | ................... | G06F 16/148 |
| | | | | 711/154 |
| 2023/0143926 A1* | 5/2023 | Inbar | ................ | G06F 3/0644 |
| | | | | 711/154 |
| 2024/0012578 A1* | 1/2024 | Lee | ................... | G06F 3/0656 |

OTHER PUBLICATIONS

International Search Report and Written Opinion—PCT/US2024/012951—ISA/EPO—May 2, 2024.

* cited by examiner

*Primary Examiner* — Kaushikkumar M Patel
(74) *Attorney, Agent, or Firm* — Loza & Loza, LLP/Qualcomm (57) ABSTRACT

Aspects of the present disclosure provide various techniques, apparatuses, and methods that can improve the memory resource utilization of a data storage device that uses nonvolatile memory (NVM) to store data. In some aspects, the data storage device can be provided with multiple write buffers to improve the write throughput of the device. In some aspects, the data storage device can use a utilization array to keep track of the utilization information of each write buffer. In some aspects, the data storage device can repurpose the memory of a write buffer with low utilization to serve an active logical unit which becomes full, thus preserving the function of the write buffer of the active logical unit.

25 Claims, 9 Drawing Sheets

WRITE BUFFER AND LOGICAL UNIT MANAGEMENT IN A DATA STORAGE DEVICE

TECHNICAL FIELD

The technology discussed below relates generally to a data storage device, and more particularly, to techniques for write buffers and logical units management of a data storage device.

INTRODUCTION

A data storage device may include volatile memories and/or nonvolatile memories for storing data. A volatile memory cannot retain data stored therein at power-off, but a nonvolatile memory can retain data stored therein at power-off. Some examples of volatile memories include a static random access memory (SRAM), a dynamic RAM (DRAM), and a synchronous DRAM (SDRAM). Some examples of nonvolatile memories include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), and ferroelectric RAM (FRAM).

Flash memory is widely used in computing devices, mobile devices, and wireless communication devices to store large quantities of data. In some aspects, a host device can communicate with a flash memory-based storage device using a universal flash storage (UFS) interface defined by the JEDEC (Joint Electron Device Engineering Council) standard. A flash memory-based storage device can use a write buffer to improve performance such as write throughput. A write buffer is a temporary storage used to store incoming write data before the data are written to the main storage, such as NAND flash memory. The write buffer can optimize the write performance of the storage device by allowing more efficient write operations to the NAND flash memory of the data storage device. Further, by using a write buffer, the data storage device can increase the write performance by reducing the number of write operations required to store incoming data, which can also help to extend the lifespan of the main storage. In some aspects, the write buffer can be implemented using single-level cell (SLC) memory. An SLC buffer can store a single bit of data per cell, resulting in higher write performance and greater endurance compared to multi-level cell (MLC) and triple-level cell (TLC) memory, which stores two or more bits of data per cell.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

One aspect of the present disclosure provides a data storage device that includes a plurality of logical units (LUs) and a plurality of write buffers, each associated with a respective one of the plurality of LUs. The data storage device further includes a controller configured to receive data to be stored in a first logical unit (LU) of the plurality of LUs associated with a first write buffer of the plurality of write buffers, the first LU having insufficient space to store the data. The controller is further configured to identify a second write buffer of the plurality of write buffers associated with a second LU of the plurality of LUs, the second write buffer being underutilized to buffer data for the second LU. The controller is further configured to repurpose memory resources of the second write buffer to increase a storage capacity of the first LU. The controller is further configured to send the data to the first LU with a capacity expanded using the memory resources of the second write buffer.

One aspect of the present disclosure provides a method of using a data storage device. The method includes receiving data to be stored in a first logical unit (LU) of a plurality of logical units (LUs) associated with a first write buffer of a plurality of write buffers, the first LU having insufficient space to store the data. The method further includes identifying a second write buffer of the plurality of write buffers associated with a second LU, the second write buffer being underutilized to buffer data for the second LU. The method further includes repurposing memory resources of the second write buffer to increase a storage capacity of the first LU. The method further includes sending the data to the first LU with a capacity expanded using the memory resources of the second write buffer.

One aspect of the present disclosure provides a data storage device. The data storage device includes means for receiving data to be stored in a first logical unit (LU) of a plurality of LUs associated with a first write buffer of a plurality of write buffers, the first LU having insufficient space to store the data. The data storage device further includes means for identifying a second write buffer of the plurality of write buffers associated with a second LU of the plurality of LUs, the second write buffer being underutilized to buffer data for the second LU. The data storage device further includes means for repurposing memory resources of the second write buffer to increase a storage capacity of the first LU. The data storage device further includes means for sending the data to the first LU with a capacity expanded using the memory resources of the second write buffer.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, processes, operations, elements, and/or components, but do not preclude the presence or addition of one or more other features, integers, processes, operations, elements, components, and/or groups thereof.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the examples described herein, the corresponding form of any such examples may be described herein as, for example, "logic configured to" perform the described action.

Aspects of the present disclosure provide various techniques, apparatuses, and methods that can improve the memory resource utilization of a data storage device. The data storage device can use nonvolatile memory (NVM) to store data. An example of nonvolatile memory is flash memory (e.g., NAND-based flash memory). The flash memory can be accessed or represented as a plurality of logical units. Each logical unit can be identified by a unique logical unit number (LUN). In some aspects, the data storage device can be provided with multiple write buffers to improve the write throughput of the device. In some aspects, the write buffers can be implemented using single-level cell (SLC) memory, and the main storage can be implemented using multi-level cell (MLC) or triple-level cell (TLC) memory. In some aspects, the storage device can use a utilization array to keep track of the utilization information of each write buffer. In some aspects, the data storage device can repurpose the memory of a write buffer with low utilization to serve an active logical unit which becomes full, thus preserving the function of the write buffer of the active logical unit.

Figure 1:
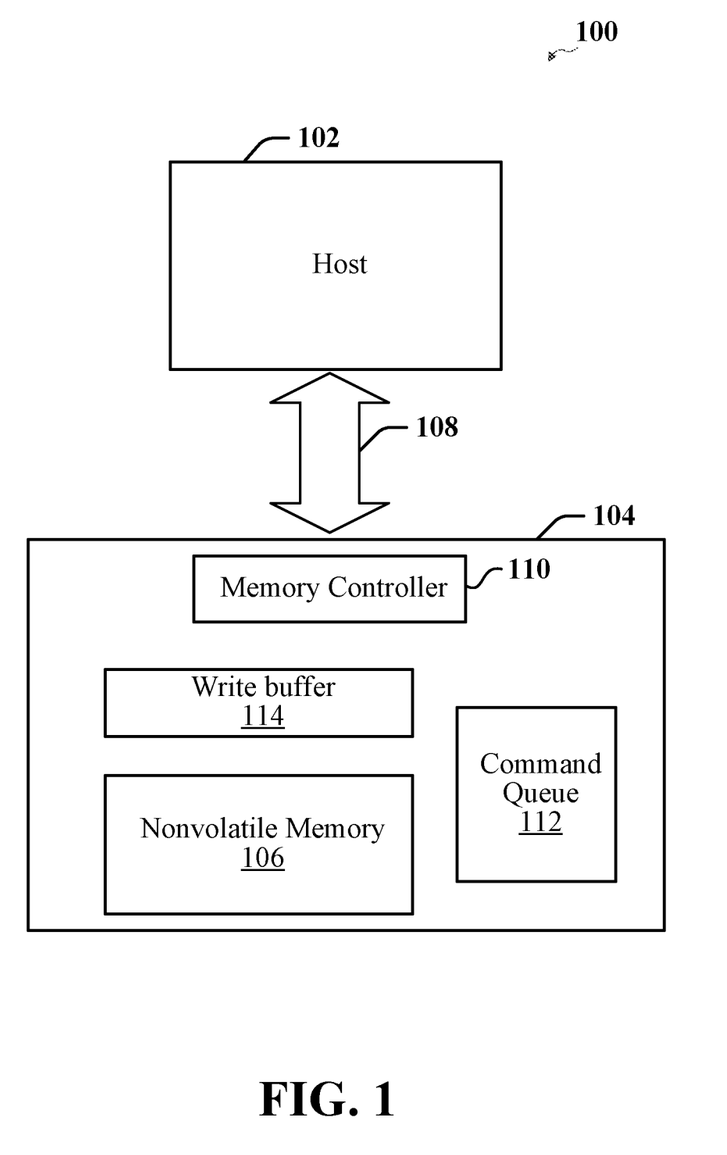
FIG. 1 is a block diagram illustrating a data storage system according to some aspects of the present disclosure.

FIG. 1 is a block diagram illustrating a data storage system 100 according to some aspects of the disclosure. A data storage system 100 may include a host 102 and a data storage device 104. In some examples, the data storage system 100 may be implemented in a portable computer, a tablet, a smartphone, a wearable device, a wireless communication device, a base station, an Internet of Things (IOT) device, etc. In some aspects, the host 102 may be a processor such as a central processing unit (CPU), a graphical processing unit (GPU), a digital signal processor (DSP), a controller, a microcontroller, an application processor (AP), a neural processing unit (NPU), a field-programmable gate array (FPGA), etc. In other aspects, the host 102 can be any device that needs to store data in a data storage device.

The host 102 can use the data storage device 104 to store data for various operations. In some aspects, the data storage device 104 may store data using nonvolatile memory 106. In one example, the nonvolatile memory 106 can include NAND flash memory that can be configured as SLC, MLC, and/or TLC memory. In one example, the data storage device 104 and nonvolatile memory 106 may be compliant with the Universal Flash Storage (UFS) specification defined by JEDEC (Joint Electron Device Engineering Council). In one example, the host 102 can write data to and read data from the data storage device 104 using a storage interface 108 (e.g., UFS interface). In some aspects, the storage interface 108 can be implemented using various interface standards, for example, Peripheral Component Interconnect Express (PCIe) interface, Serial Advanced Technology Attachment (ATA), etc.

The host 102 can send a write command (with write data) to the data storage device 104 in order to store the data in the storage device. To read data from the data storage device 104, the host 102 can send a read command to the data storage device 104 and receive data from the storage device. In one example, the host 102 and the data storage device 104 can exchange information in the form of Universal Flash Storage Protocol Information Unit (UPIU). A UPIU can include various information transferred via the interface (e.g., interface 108) between the host 102 and the data storage device 104. For example, a UPIU can include commands, data read from or data written to the data storage device 104, and various status or control information. For example, the status information in a UPIU can provide information about the status of the data storage device 104 or the progress of a particular operation (e.g., write data to or read data from the data storage device 104). The status information can provide details about whether an operation was successful, whether an error occurred, what type of error occurred, etc. The control information in a UPIU can be used to manage the communication between the data storage device 104 (e.g., a UFS device) and the host 102. In one example, the control information can include information about the device's configuration, power management, and other parameters related to data transfer between the host and the data storage device.

In some aspects, the data storage device 104 may include a memory controller 110 for controlling access to the nonvolatile memory 106. The memory controller 110 can manage the data flow between the nonvolatile memory 106 and the host 102. In some aspects, the memory controller 110 is responsible for performing various tasks such as error correction, wear leveling, garbage collection, and power management. For example, the memory controller 110 may write data to or read data from the nonvolatile memory 106 in response to a command (e.g., a UFS read or write command) received from the host 102. In some aspects, the memory controller 110 may be a processor such as a microprocessor, a microcontroller, an FPGA, etc. In one example, when the memory controller 110 receives a write command and data from the host 102, the memory controller 110 can store the received data in the nonvolatile memory 106 according to the write command. In one example, when the memory controller 110 receives a read command from the host 102, the memory controller 110 can read data stored in the nonvolatile memory 106 according to the read command. Then, the memory controller 110 can provide the read data to the host 102, for example, via the interface 108. The data storage device 104 may include a command queue 112 (e.g., one or more command queues) that stores the commands (e.g., write commands and read commands) and data (e.g., write data) from the host 102. The command queue 112 can help improve the performance of the data storage device by allowing it to process multiple commands concurrently and/or optimize the order in which the commands are executed.

In some aspects, the data storage device 104 may include a write buffer 114 to support a boosted write function (e.g., a turbo write operation) to increase the write speed or throughput of the data storage device 104/nonvolatile memory 106. The write buffer 114 is configured to have a higher write speed than the main storage (e.g., nonvolatile memory 106). The memory controller can temporarily store data that is received from the host in the write buffer 114 before storing the data in the main storage. In some aspects, the host 102 can send commands to the memory controller 110 via the interface 108 to control/configure the write buffer 114. In one example, the host can control the size of the write buffer, enable or disable the write buffer, and manage the data transfer between the write buffer (e.g., write buffer 114) and the main storage (e.g., nonvolatile memory 106). For example, the host can send various commands to enable the write buffer, specify the size of the write buffer, and transfer data to the write buffer. Then the host can send a command to flush the write buffer and store the data in the main storage. When the boosted write function is enabled, the data storage device 104 can perform a boosted write operation to write data to write buffer 114 at a write speed higher than that when the boosted write function is not used (i.e., a normal or non-boosted write function is used). The boosted write operation can provide improved performance (e.g., improved write speed or throughout) than writing data directed to the main storage (e.g., nonvolatile memory 106).

In some aspects, the write buffer 114 and the nonvolatile memory 106 can be included in the same physical Flash memory (e.g., NAND Flash). A first portion of the Flash memory can be configured as SLC memory to provide the write buffer 114, and a second portion of the Flash memory can be configured as MLC/TLC memory to provide the nonvolatile memory 106 (main storage). SLC memory can store one bit of information per cell, and MLC/TLC memory can store more than 1 bit of information per cell (e.g., 2 bits for MLC memory and 3 bits for TLC memory). In other aspects, the nonvolatile memory 106 can support other configurations that allow more than 3 bits of information per cell.

In some aspects, the storage device 104 may further include any other storage space, for example, a cache memory, a reserved area, a meta area for storing metadata, in addition to the write buffer 114, command queue 112, and nonvolatile memory 106 illustrated in FIG. 1. However, for convenience of description, additional description associated with the other storage space will be omitted (or minimized), and a description will be focused on the nonvolatile memory where user data are stored.

Figure 2:
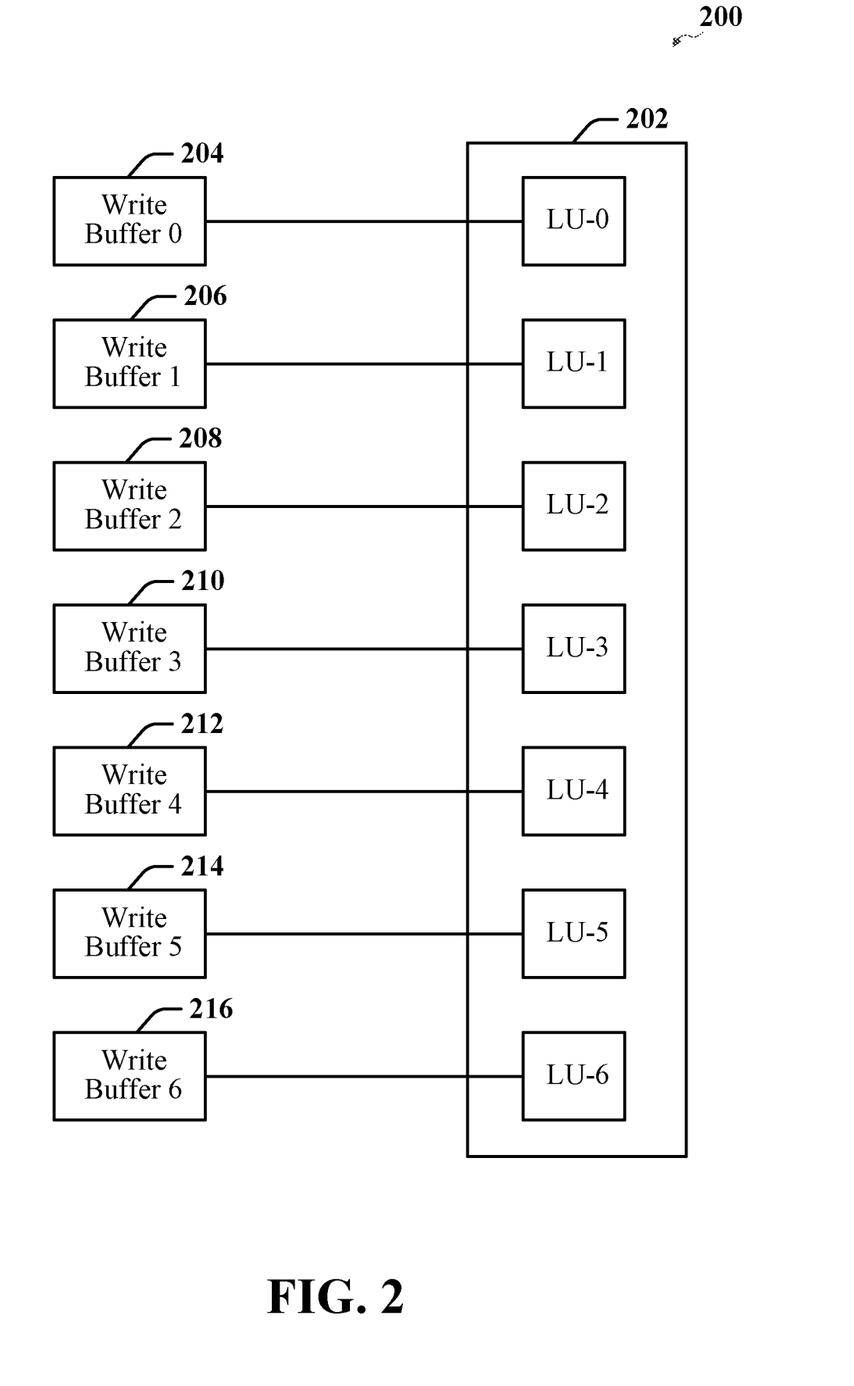
FIG. 2 is a block diagram illustrating a dedicated write buffer configuration according to some aspects of the present disclosure.

FIG. 2 illustrates a dedicated write buffer configuration 200 according to some aspects of the disclosure. A main storage 202 of a data storage device can be configured to provide a plurality of logical units (LUs), for example, LU-0, LU-1, LU-2, LU-3, LU-4, LU-5, and LU-6. In some aspects, one or more LUs can be allocated to a data partition. In one aspect, each LU can be associated with a dedicated write buffer, for example, write buffers 204, 206, 208, 210, 212, 214, and 216. In one example, the main storage and the write buffers can be implemented using the nonvolatile memory 106. In some aspects, the write buffers are configured using SLC memory, and the main storage 202 is configured using MLC or TLC memory. Each write buffer can use one or more SLC blocks to support boosted write operations for the associated LU. In a boosted write operation, when a host sends data to one of the LUs, the data can be first stored in the associated write buffer that has a higher throughput or write speed than the LU.

Figure 3:
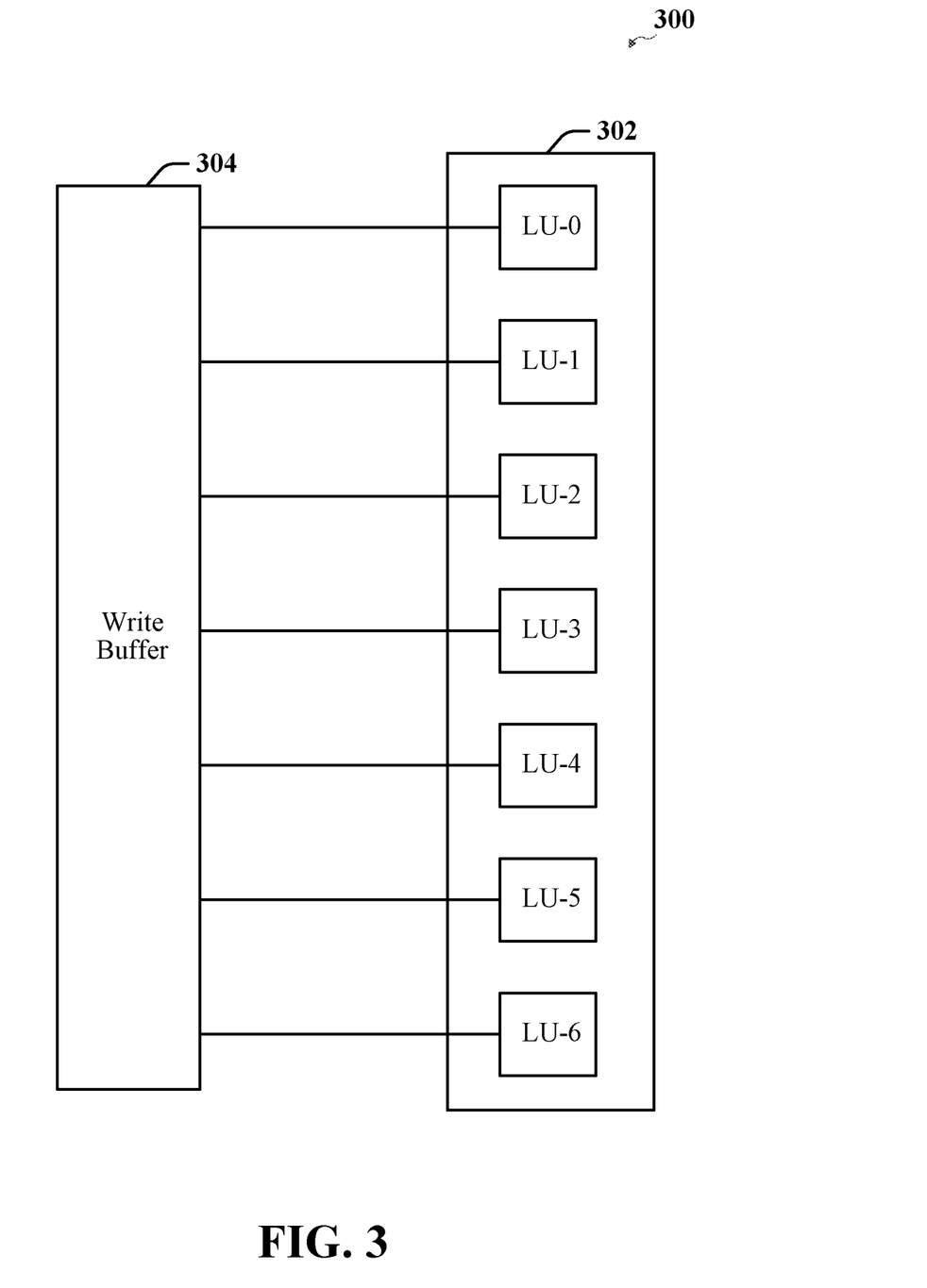
FIG. 3 is a block diagram illustrating a shared write buffer configuration according to some aspects of the present disclosure.

FIG. 3 illustrates a shared write buffer configuration 300 according to some aspects of the disclosure. A main storage 302 can be configured to provide a plurality of logical units (LUs), for example, LU-0, LU-1, LU-2, LU-3, LU-4, LU-5, and LU-6. The second write buffer configuration 300 can use a write buffer 304 that is shared by the plurality of LUs. In one example, the main storage 302 and the write buffer 304 can be implemented using the nonvolatile memory 106 of FIG. 1. In some aspects, the write buffer 304 is configured with SLC memory, and the main storage 302 is configured with MLC or TLC memory. The write buffer 304 can provide one or more SLC blocks to each associated LU for boosted write operations.

Figure 4:
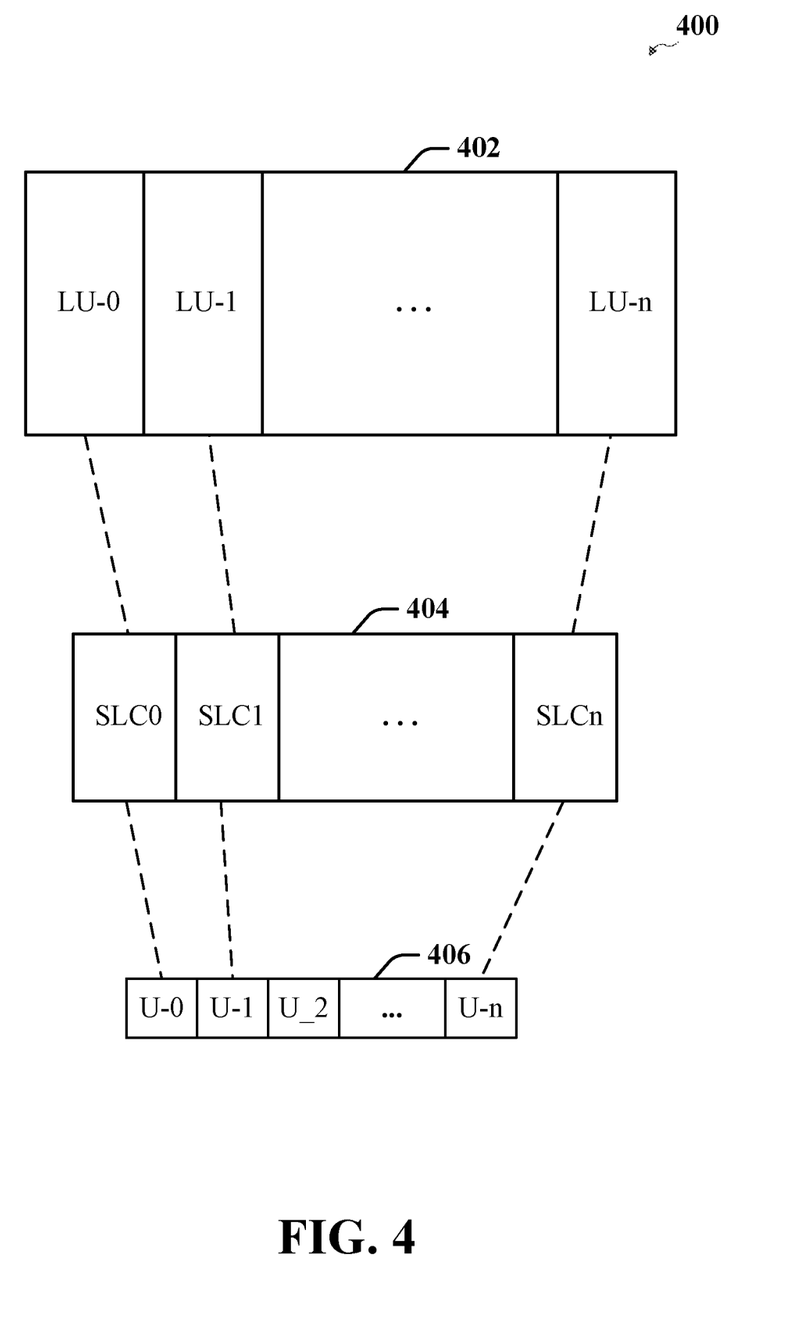
FIG. 4 is a block diagram illustrating a first mapping between write buffers and logical units of a data storage device according to some aspects of the present disclosure.

FIG. 4 illustrates a mapping between write buffers and logical units (LUs) of a data storage device according to some aspects of the disclosure. In one aspect, the write buffers and LUs may be implemented at the data storage device 104 of FIG. 1. In one aspect, the nonvolatile memory 106 (FIG. 1) can be configured to provide a plurality of LUs 402 (e.g., shown as LU-0, LU-1, . . . , LU-n in FIG. 4). Each LU can correspond to a physical memory portion of the main storage. In one example, each LU can be 50 gigabytes (GB) in size or any suitable size. The write buffers can include one or more write buffers that can enable boosted write operations of the LUs. For example, the write buffers can provide a plurality of SLC blocks 404 (e.g., SLC0, SLC1, . . . SLCn). In one example, each SLC block can be 2 GB in size or any suitable size. Each SLC block can be associated with a specific LU. For example, SLC0 is associated with LU-0, SLC1 is associated with LU-1, LU-n is associated with SLCn, and so on. Using boosted write operations, when a host (e.g., host 102 of FIG. 1) writes data to a LU, the data is first written to the associated SLC block that has faster write throughput than the LU. The write buffer can improve the write performance of the main storage by caching the write data before writing the data to the LU.

In some aspects, some LUs (e.g., LUs allocated to a user data partition) may be used more frequently (e.g., read/write operations) as compared to others LUs (e.g., LUs allocated to backup data partition). When a LU (e.g., LU-n) becomes full or does not have sufficient space for new data, the data storage device can use the associated SLC block (e.g., SLCn) to store new data written to the LU. In this case, the SLC block loses its function as a write buffer for boosted write operations. However, for a LU that is not frequently used or underutilized, the associated SLC blocks may be idle or infrequently used to buffer data.

Figure 5:
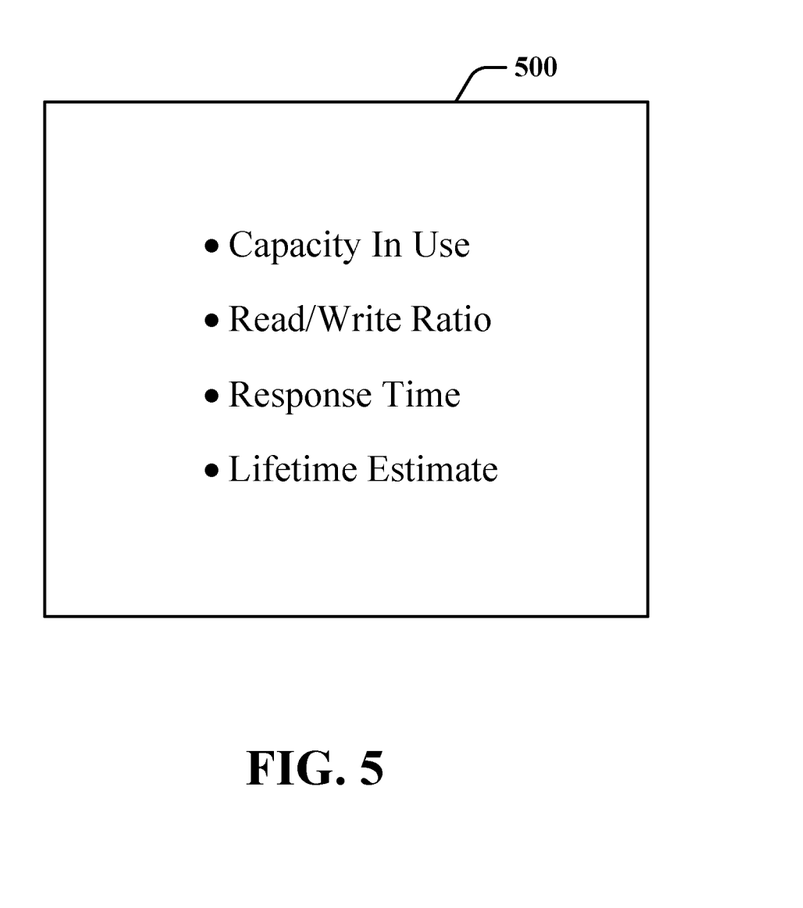
FIG. 5 is a diagram illustrating some exemplary utilization factors according to some aspects of the present disclosure.

Aspects of the disclosure provide techniques to repurpose the memory resources of underutilized SLC blocks more efficiently. In some aspects, the data storage device can keep track of the utilization of the SLC blocks 404 to facilitate more efficient use of resources (e.g., physical memory) of the SLC blocks. For example, the data storage device can include a utilization array 406 to store the utilization information of each SLC block. The utilization information (e.g., U-0, U-1, . . . . U-n) can characterize the usage or utilization of each SLC block based on various factors. FIG. 5 illustrates various exemplary utilization information 500 according to some aspects. In one aspect, the utilization information 500 can indicate the percentage of the storage capacity of each SLC block that is currently used to store data. In one aspect, the utilization information 500 can indicate the read-to-write ratio of each SLC block. The read-to-write ratio indicates the ratio of read operations to write operations. A high read-to-write ratio can indicate that an SLC block is used more for reading than writing. A low read-to-write ratio can indicate that an SLC block is not frequently used for boosted write operations. In one aspect, the utilization information 500 can indicate the response time of each SLC block. The response time refers to the time it takes for the SLC block to respond to a read or write command. A slow response time can indicate that the SLC block is experiencing high utilization. In one aspect, the utilization information 500 can indicate a lifetime estimate of each SLC block. A low lifetime estimate can indicate that the buffer has experienced high utilization (e.g., boosted write operations). By monitoring the utilization information, the data storage device (e.g., memory controller 110) can determine which SLC blocks may be underutilized.

Figure 6:
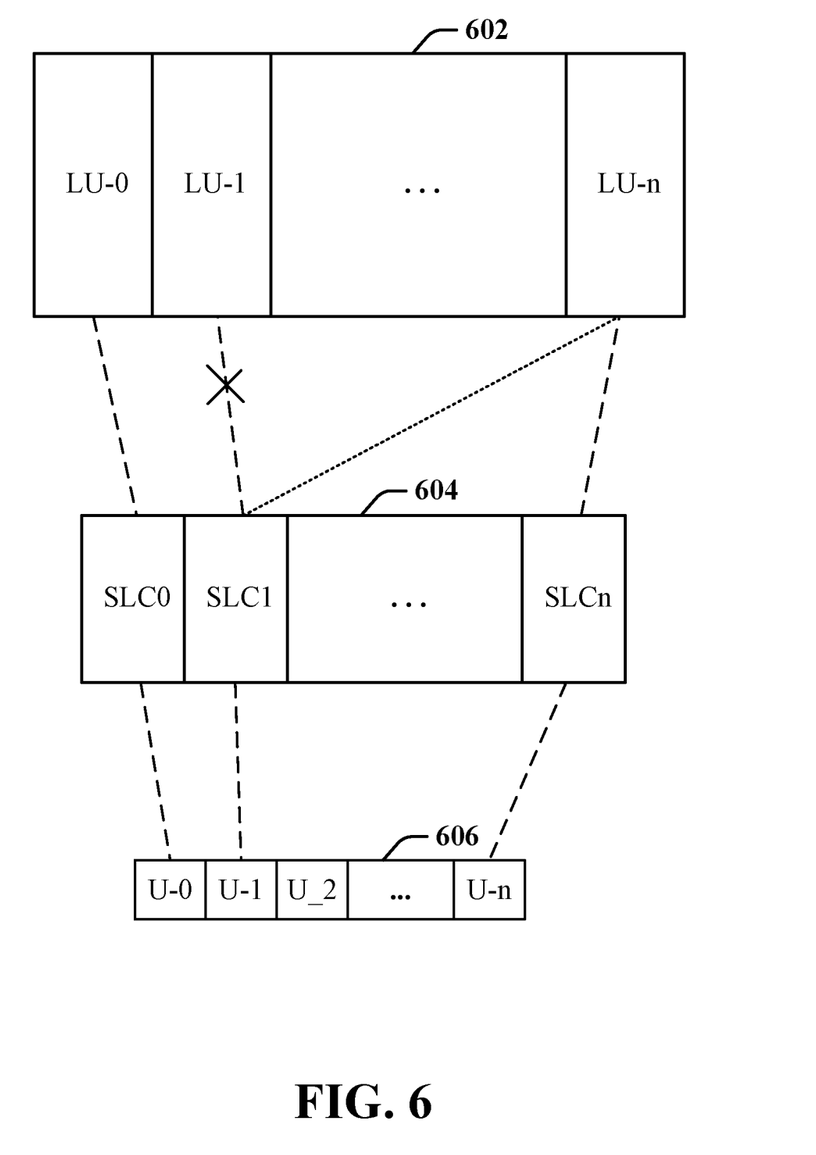
FIG. 6 is a block diagram illustrating a process of repurposing a write buffer to improve resource utilization of a data storage device according to some aspects of the present disclosure.

FIG. 6 is a diagram illustrating a process of repurposing a write buffer to improve resource utilization of a data storage device according to some aspects of the disclosure. The data storage device may have a plurality of LUs 602 (e.g., LU-0, LU-1, . . . , LU-n) and a plurality of SLC blocks 604 that can be used to perform boosted write operations for the LUs. In some aspects, the LUs 602 may be the same as the LUs 402 of FIG. 4. In one example, when a LU (e.g., LU-n) becomes full or does not have sufficient space for new data, the data storage device can use the associated SLC block (e.g., SLC-n) or its memory resources to store new data for the LU. Effectively, the resources of the SLC are used to increase the storage capacity of the LU. However, when the SLC block is used to increase the capacity of the associated LU in order to store more data, the SLC block can no longer support boosted write operations. Therefore, the throughput of the LU may decrease without an SLC block that can perform boosted write operations.

In some aspects, the data storage device can expand storage capacity of a LU (e.g., LU-n of FIG. 6) using the memory resources of an SLC block (SLC1) associated with a different LU (e.g., LU-1 of FIG. 6). Referring to FIG. 6, for example, the data storage device can repurpose the memory resources of SLC1 to expand the storage capacity of LU-n when it becomes full or does not have sufficient space for new data. Thus, the data storage device can preserve LU-n's originally associated SLCn for boosted write operations.

Figure 7:
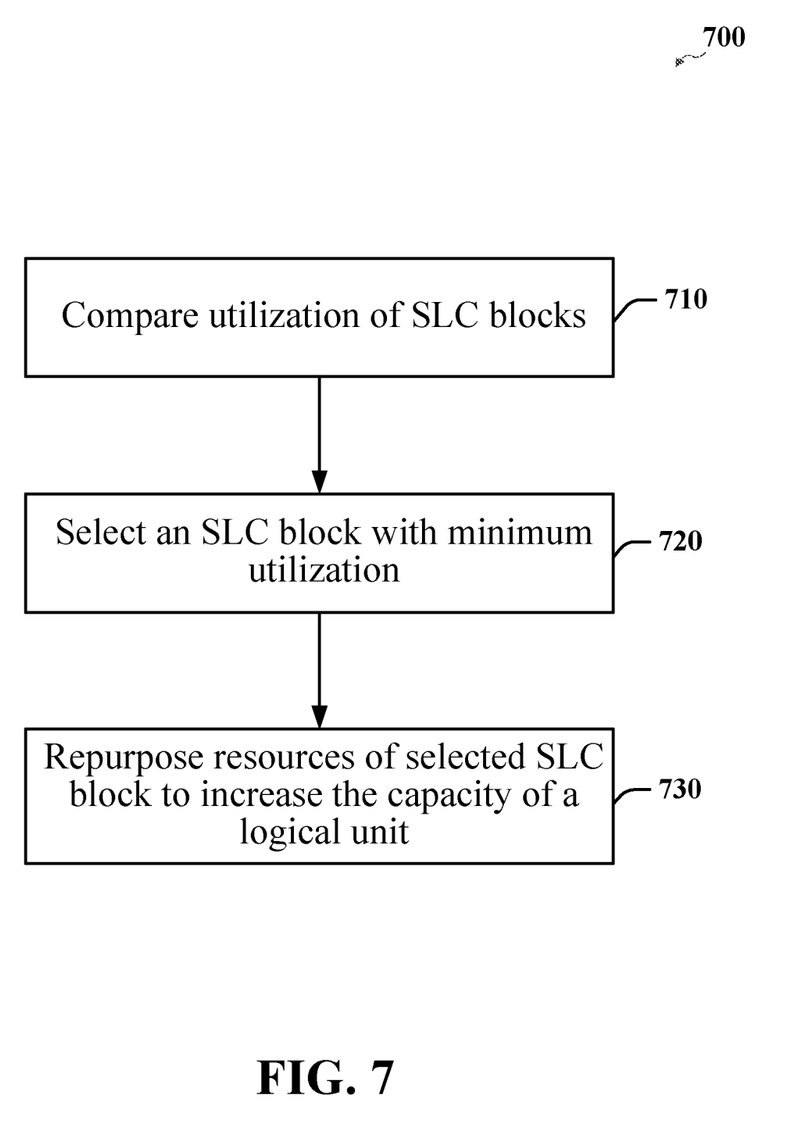
FIG. 7 is a flow chart illustrating a process of selecting a single level cell (SLC) block to increase a storage capacity of a logical unit (LU) according to some aspects of the present disclosure.

FIG. 7 is a flow chart illustrating a process 700 of selecting an SLC block to increase a storage capacity of a LU according to some aspects of the disclosure. In one example, the process can be performed by the data storage device 104 of FIG. 1. In one example, the data storage device can use the process 700 to select an underutilized SLC block that can be repurposed to increase the storage capacity of an LU (e.g., LU-n of FIG. 6) that becomes full or does not have sufficient space for new data.

At 710, the data storage device can compare the utilization of a plurality of SLC blocks (e.g., SLC blocks 404 of FIG. 4 and SLC blocks 604 of FIG. 6) and generate utilization information based on the comparison. The data storage device can store the utilization information (e.g., utilization information 500 of FIG. 5) of the SLC blocks in a utilization array (e.g., utilization array 406 of FIG. 4 and/or utilization array 606 of FIG. 6). At 720, the data storage device can select an SLC block that is underutilized (e.g., minimum utilization) among all SLC blocks. In one example, the data storage device can select the SLC block with the minimum storage capacity in use. In one example, the data storage device can select the SLC block with the highest read-to-write ratio. In one example, the data storage device can select the SLC block with the fastest response time. In one example, the data storage device can select the SLC block with the longest lifetime estimate. In other aspects, the data storage device can select the SLC block based on any combinations of the above factors that indicate the SLC block with the minimum usage.

At 730, the data storage device can repurpose memory resources of the selected SLC block to increase the storage capacity of the LU that becomes full (i.e., no empty space) or does not have sufficient space to store new data received from a host. The selected SLC block (e.g., SLC1) may initially be associated with a different LU (e.g., LU-1) before the SLC block is reallocated to increase the storage capacity of another LU (e.g., LU-n). In some aspects, the data storage device can update the mapping or association (e.g., logical block addressing (LBA)) between the selected SLC block and the LUs of the storage device.

Figure 8:
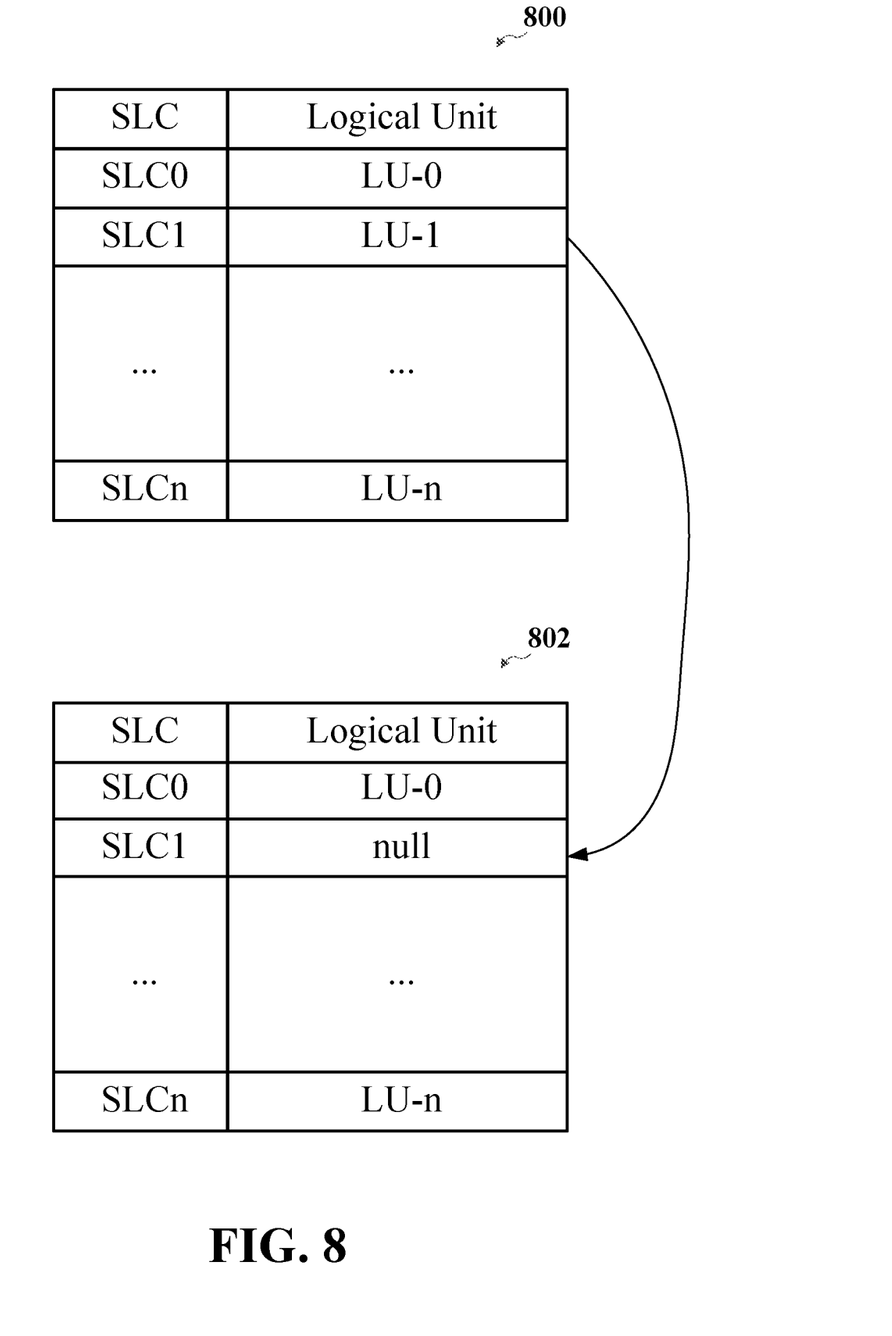
FIG. 8 is a block diagram illustrating exemplary mapping tables between SLC blocks and LUs of a data storage device according to some aspects of the present disclosure.

FIG. 8 illustrates exemplary mapping tables between SLC blocks and LUs of a data storage device according to some aspects of the disclosure. A first table 800 shows a first mapping between SLC blocks and LUs of the data storage device. For example, SLC0 is mapped to LU-0, SLC1 is mapped to LU-1, SLCn is mapped to LU-n, and so on. As described above in relation to FIGS. 4-7, the data storage device can repurpose an SLC block to expand the storage capacity of a LU. In one example, a second table 802 illustrates a second mapping between SLC blocks and LUs after the SLC1 block is repurposed to expand the storage capacity of LU-n. In this case, the second table 802 can be updated to show that SLC1 block is no longer allocated to LU-1 as a write buffer. For example, the mapping table 802 can use "null" (or any suitable label) to indicate that SLC1 block is not mapped to any LU as a write buffer. In one aspect, the data storage device can map the physical memory of the repurposed SLC1 block to LU-n using logical block addressing (LBA) to expand the storage capacity of LU-n. For example, the original capacity of LU-n may be expanded from X to X+Y, where X is the original capacity of LU-n, and Y is the capacity of SLC1 or its corresponding physical memory.

Figure 9:
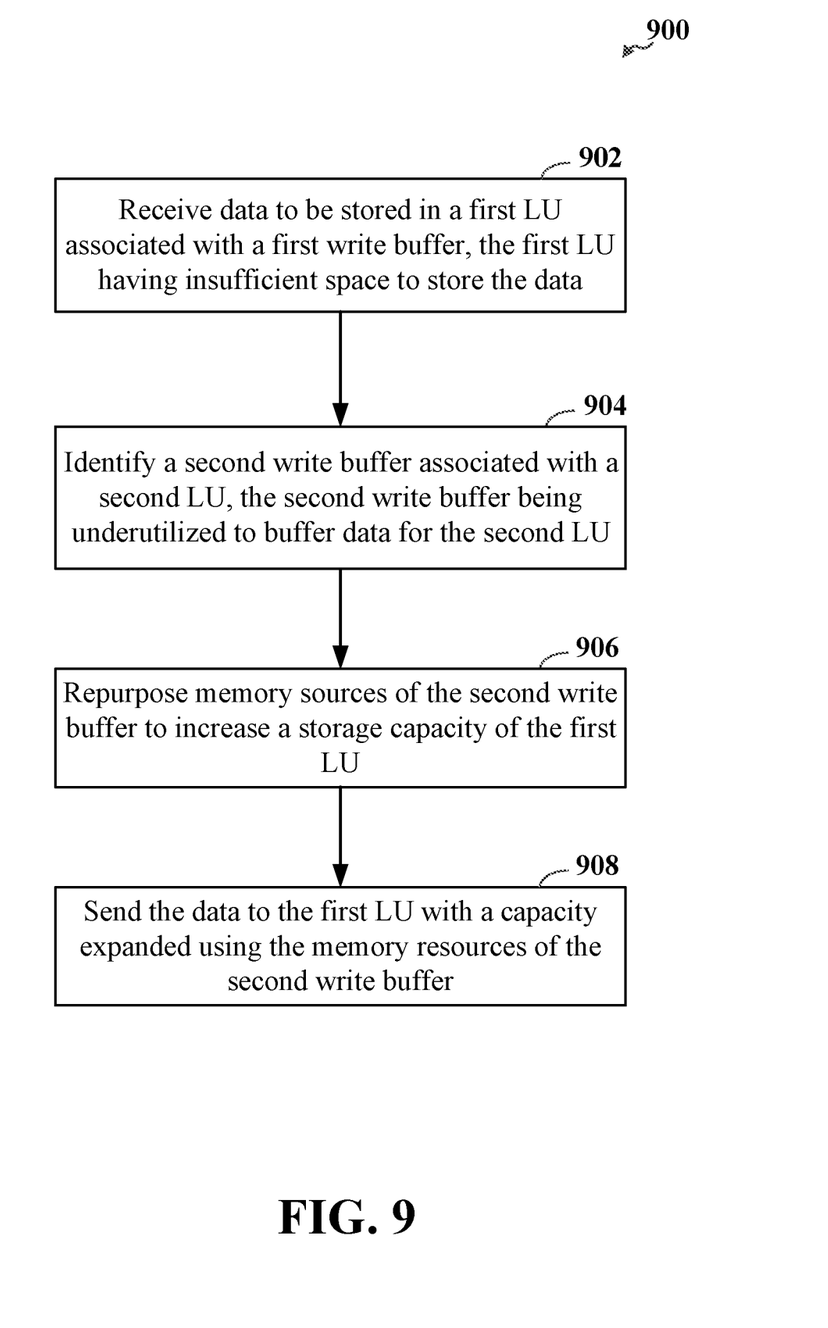
FIG. 9 is a flow chart of a method for repurposing a write buffer of a data storage device according to some aspects of the present disclosure.

FIG. 9 illustrates a flow chart of a method 900 for repurposing a write buffer of a storage device according to aspects of the present disclosure. In one example, the method 900 can be performed using the data storage device 104 of FIG. 1. In other aspects, the method may be adapted to suit other data storage devices. In some aspects, the data storage device 104 can repurpose resources of an SLC block to expand a storage capacity of an LU that becomes full so that the original write buffer of the LU can continue to support boosted write operations.

In one aspect, the data storage device includes a nonvolatile memory (NVM) configured to provide a plurality of logical units comprising a first logical unit (LU) and a second LU. The nonvolatile memory further includes a plurality of write buffers, including a first write buffer associated with the first LU and a second write buffer associated with the second LU.

At 902, the method includes receiving data to be stored in the first LU associated with the first write buffer. The first LU may not have sufficient space to store the data. In one example, the data storage device 104 can provide a means (e.g., memory controller 110) to receive the data to be stored in the first LU (e.g., LU-n of FIGS. 4 and 6). In one example, the memory controller 110 may receive the data from a host 102 via the storage interface 108. In one example, the memory controller 110 may receive a write command with the data from the host.

At 904, the method includes identifying the second write buffer associated with the second LU, the second write buffer being underutilized to buffer data for the second LU. In one aspect, the data storage device 104 can provide a means (e.g., memory controller 110) to identify the second write buffer (e.g., SLC1 of FIGS. 4 and 6) being underutilized to buffer data for the second LU (e.g., LU-1). For example, the data storage device 104 can identify the underutilized write buffer using one or more of the utilization information 500 of FIG. 5.

At 906, the method includes repurposing the memory resources of the second write buffer to increase the storage capacity of the first LU. In one aspect, the data storage device 104 can provide a means (e.g., memory controller 110) to repurpose the memory resources of the second write buffer to increase the storage capacity of the first LU. In one example, the memory resources may include SLC, MLC, or TLC memory.

At 908, the method further includes sending the data to the first LU with a capacity expanded using the memory resources of the second write buffer. In one aspect, the memory controller 110 can provide a means to send the data to the first LU. For example, the capacity of the first LU can be expanded from X to X+Y, where X is the original capacity of the first LU and Y is the added capacity using the memory resources of the second write buffer.

In some aspects, the data storage device can maintain utilization information of the plurality of write buffers in a utilization array (e.g., array 406 of FIG. 4 and array 606 of FIG. 6). In some aspects, the data storage device can identify the underutilized second write buffer based on the utilization information. In some aspects, the data storage device can identify the underutilized second write buffer with the minimum utilization among the plurality of write buffers based on the utilization information. In some aspects, the utilization array can include a plurality of entries, each entry including the utilization information of a corresponding one of the plurality of write buffers. In some aspects, the utilization information can include at least one of: storage capacity in-use of each of the plurality of write buffers; a read-to-write ratio of each of the plurality of write buffers; a response time of each of the plurality of write buffers; or a lifetime estimate of each of the plurality of write buffers. In some aspects, the data storage device can restore the second write buffer to buffer data for the second LU when the amount of data stored in the first LU is less than a predetermined threshold. In some aspects, the data storage device can map logical addresses of the first LU to the physical memory of the repurposed second write buffer.

The following provides an overview of examples of the present disclosure.

A first aspect of the disclosure provides a data storage device comprising: a plurality of logical units (LUs); a plurality of write buffers, each associated with a respective one of the plurality of LUs; and a controller configured to: receive data to be stored in a first logical unit (LU) of the plurality of LUs associated with a first write buffer of the plurality of write buffers, the first LU having insufficient space to store the data; identify a second write buffer of the plurality of write buffers associated with a second LU of the plurality of LUs, the second write buffer being underutilized to buffer data for the second LU; repurpose memory resources of the second write buffer to increase a storage capacity of the first LU; and send the data to the first LU with a capacity expanded using the memory resources of the second write buffer.

In a second aspect, alone or in combination with the first aspect, wherein the controller is further configured to: maintain utilization information of the plurality of write buffers in a utilization array; and identify the underutilized second write buffer based on the utilization information.

In a third aspect, alone or in combination with the second aspect, wherein the controller is further configured to: identify the underutilized second write buffer with the minimum utilization among the plurality of write buffers based on the utilization information.

In a fourth aspect, alone or in combination with any of the second and third aspects, wherein the utilization array comprises a plurality of entries, each entry comprising the utilization information of a corresponding one of the plurality of write buffers.

In a fifth aspect, alone or in combination with the second aspect, wherein the utilization information comprises at least one of: a storage capacity of each of the plurality of write buffers; a read-to-write ratio of each of the plurality of write buffers; a response time of each of the plurality of write buffers; or a lifetime estimate of each of the plurality of write buffers.

In a sixth aspect, alone or in combination with any of the first, second, third, and fifth aspects, wherein the controller is further configured to: buffer the data sent to the first LU with the expanded capacity using the first write buffer.

In a seventh aspect, alone or in combination with any of the first, second, third, and fifth aspects, wherein the controller is further configured to: restore the second write buffer to buffer data for the second LU when an amount of data stored in the first LU is less than a predetermined threshold.

In an eighth aspect, alone or in combination with any of the first, second, third, and fifth aspects, wherein the controller is further configured to: map logical addresses of the first LU to physical memory of the repurposed second write buffer.

In a ninth aspect, alone or in combination with any of the first, second, third, and fifth aspects, the data storage device further comprises: a nonvolatile memory configured to provide the plurality of LUs and the plurality of write buffers, wherein the plurality of LUs are configured to store more bits per cell than the plurality of write buffers.

A tenth aspect of the present disclosure provides a method of using a data storage device, the method comprising: receiving data to be stored in a first logical unit (LU) of a plurality of logical units (LUs) associated with a first write buffer of a plurality of write buffers, the first LU having insufficient space to store the data; identifying a second write buffer of the plurality of write buffers associated with a second LU, the second write buffer being underutilized to buffer data for the second LU; repurposing memory resources of the second write buffer to increase a storage capacity of the first LU; and sending the data to the first LU with a capacity expanded using the memory resources of the second write buffer.

In an eleventh aspect, alone or in combination with the tenth aspect, the method further comprises: maintaining utilization information of the plurality of write buffers in a utilization array; and identifying the underutilized second write buffer based on the utilization information.

In a twelfth aspect, alone or in combination with the eleventh aspect, the method further comprises: identifying the underutilized second write buffer with the minimum utilization among the plurality of write buffers based on the utilization information.

In a thirteenth aspect, alone or in combination with any of the eleventh and twelfth aspects, wherein the utilization array comprises a plurality of entries, each entry comprising the utilization information of a corresponding one of the plurality of write buffers.

In a fourteenth aspect, alone or in combination with the eleventh aspect, wherein the utilization information comprises at least one of: a storage capacity of each of the plurality of write buffers; a read-to-write ratio of each of the plurality of write buffers; a response time of each of the plurality of write buffers; or a lifetime estimate of each of the plurality of write buffers.

In a fifteenth aspect, alone or in combination with any of the tenth, eleventh, twelfth, and fourteenth aspects, the method further comprises: buffering the data sent to the first LU with the expanded capacity using the first write buffer.

In a sixteenth aspect, alone or in combination with any of the tenth, eleventh, twelfth, and fourteenth aspects, the method further comprises: restoring the second write buffer to buffer data for the second LU when an amount of data stored in the first LU is less than a predetermined threshold.

In a seventeenth aspect, alone or in combination with any of the tenth, eleventh, twelfth, and fourteenth aspects, the method further comprises: mapping logical addresses of the first LU to physical memory of the repurposed second write buffer.

An eighteenth aspect of the present disclosure provides a data storage device. The data storage device comprises: means for receiving data to be stored in a first logical unit (LU) of a plurality of LUs associated with a first write buffer of a plurality of write buffers, the first LU having insufficient space to store the data; means for identifying a second write buffer of the plurality of write buffers associated with a second LU of the plurality of LUs, the second write buffer being underutilized to buffer data for the second LU; means for repurposing memory resources of the second write buffer to increase a storage capacity of the first LU; and means for sending the data to the first LU with a capacity expanded using the memory resources of the second write buffer.

In a nineteenth aspect, alone or in combination with the eighteenth aspect, the data storage device further comprises: means for maintaining utilization information of the plurality of write buffers in a utilization array; and means for identifying the underutilized second write buffer based on the utilization information.

In a twentieth aspect, alone or in combination with the nineteenth aspect, the data storage device further comprises: means for identifying the underutilized second write buffer with the minimum utilization among the plurality of write buffers based on the utilization information.

In a twenty-first aspect, alone or in combination with any of the nineteenth and twentieth aspects, wherein the utilization array comprises a plurality of entries, each entry comprising the utilization information of a corresponding one of the plurality of write buffers.

In a twenty-second aspect, alone or in combination with the nineteenth aspect, wherein the utilization information comprises at least one of: a storage capacity of each of the plurality of write buffers; a read-to-write ratio of each of the plurality of write buffers; a response time of each of the plurality of write buffers; or a lifetime estimate of each of the plurality of write buffers.

In a twenty-third aspect, alone or in combination with any of the eighteenth, nineteenth, twentieth, and twenty-second aspects, the data storage device further comprises: means for buffering the data sent to the first LU with the expanded capacity using the first write buffer.

In a twenty-fourth aspect, alone or in combination with any of the eighteenth, nineteenth, twentieth, and twenty-second aspects, the data storage device further comprises: means for restoring the second write buffer to buffer data for the second LU when an amount of data stored in the first LU is less than a predetermined threshold.

In a twenty-fifth aspect, alone or in combination with any of the eighteenth, nineteenth, twentieth, and twenty-second aspects, the data storage device further comprises: means for mapping logical addresses of the first LU to physical memory of the repurposed second write buffer.

It is to be appreciated that the present disclosure is not limited to the exemplary terms used above to describe aspects of the present disclosure. For example, bandwidth may also be referred to as throughput, data rate or another term.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A data storage device comprising:
a plurality of logical units (LUs);
a plurality of write buffers, each associated with a respective one of the plurality of LUs; and
a controller configured to:
receive data to be stored in a first logical unit (LU) of the plurality of LUs associated with a first write buffer of the plurality of write buffers, the first LU having insufficient space to store the data;
identify a second write buffer of the plurality of write buffers associated with a second LU of the plurality of LUs, the second write buffer being underutilized to buffer data for the second LU;
repurpose memory resources of the second write buffer to increase a storage capacity of the first LU; and
send the data to the first LU with a capacity expanded using the memory resources of the second write buffer.

2. The data storage device of claim 1, wherein the controller is further configured to:
maintain utilization information of the plurality of write buffers in a utilization array; and
identify the underutilized second write buffer based on the utilization information.

3. The data storage device of claim 2, wherein the controller is further configured to:
identify the underutilized second write buffer with the minimum utilization among the plurality of write buffers based on the utilization information.

4. The data storage device of claim 2, wherein the utilization array comprises a plurality of entries, each entry comprising the utilization information of a corresponding one of the plurality of write buffers.

5. The data storage device of claim 2, wherein the utilization information comprises at least one of:
a storage capacity of each of the plurality of write buffers;
a read-to-write ratio of each of the plurality of write buffers;
a response time of each of the plurality of write buffers; or
a lifetime estimate of each of the plurality of write buffers.

6. The data storage device of claim 1, wherein the controller is further configured to:
buffer the data sent to the first LU with the expanded capacity using the first write buffer.

7. The data storage device of claim 1, wherein the controller is further configured to:
restore the second write buffer to buffer data for the second LU when an amount of data stored in the first LU is less than a predetermined threshold.

8. The data storage device of claim 1, wherein the controller is further configured to:
map logical addresses of the first LU to physical memory of the repurposed second write buffer.

9. The data storage device of claim 1, further comprising:
a nonvolatile memory configured to provide the plurality of LUs and the plurality of write buffers, wherein the plurality of LUs are configured to store more bits per cell than the plurality of write buffers.

10. A method of using a data storage device, the method comprising:
receiving data to be stored in a first logical unit (LU) of a plurality of logical units (LUs) associated with a first write buffer of a plurality of write buffers, the first LU having insufficient space to store the data;
identifying a second write buffer of the plurality of write buffers associated with a second LU, the second write buffer being underutilized to buffer data for the second LU;
repurposing memory resources of the second write buffer to increase a storage capacity of the first LU; and
sending the data to the first LU with a capacity expanded using the memory resources of the second write buffer.

11. The method of claim 10, further comprising:
maintaining utilization information of the plurality of write buffers in a utilization array; and
identifying the underutilized second write buffer based on the utilization information.

12. The method of claim 11, further comprising:
identifying the underutilized second write buffer with the minimum utilization among the plurality of write buffers based on the utilization information.

13. The method of claim 11, wherein the utilization array comprises a plurality of entries, each entry comprising the utilization information of a corresponding one of the plurality of write buffers.

14. The method of claim 11, wherein the utilization information comprises at least one of:
a storage capacity of each of the plurality of write buffers;
a read-to-write ratio of each of the plurality of write buffers;
a response time of each of the plurality of write buffers; or
a lifetime estimate of each of the plurality of write buffers.

15. The method of claim 10, further comprising:
buffering the data sent to the first LU with the expanded capacity using the first write buffer.

16. The method of claim 10, further comprising:
restoring the second write buffer to buffer data for the second LU when an amount of data stored in the first LU is less than a predetermined threshold.

17. The method of claim 10, further comprising:
mapping logical addresses of the first LU to physical memory of the repurposed second write buffer.

18. A data storage device comprising:
means for receiving data to be stored in a first logical unit (LU) of a plurality of LUs associated with a first write buffer of a plurality of write buffers, the first LU having insufficient space to store the data;
means for identifying a second write buffer of the plurality of write buffers associated with a second LU of the plurality of LUs, the second write buffer being underutilized to buffer data for the second LU;
means for repurposing memory resources of the second write buffer to increase a storage capacity of the first LU; and
means for sending the data to the first LU with a capacity expanded using the memory resources of the second write buffer.

19. The data storage device of claim 18, further comprising:
means for maintaining utilization information of the plurality of write buffers in a utilization array; and means for identifying the underutilized second write buffer based on the utilization information.

20. The data storage device of claim 19, further comprising:
means for identifying the underutilized second write buffer with the minimum utilization among the plurality of write buffers based on the utilization information.

21. The data storage device of claim 19, wherein the utilization array comprises a plurality of entries, each entry comprising the utilization information of a corresponding one of the plurality of write buffers.

22. The data storage device of claim 19, wherein the utilization information comprises at least one of:
a storage capacity of each of the plurality of write buffers;
a read-to-write ratio of each of the plurality of write buffers;
a response time of each of the plurality of write buffers; or
a lifetime estimate of each of the plurality of write buffers.

23. The data storage device of claim 18, further comprising:
means for buffering the data sent to the first LU with the expanded capacity using the first write buffer.

24. The data storage device of claim 18, further comprising:
means for restoring the second write buffer to buffer data for the second LU when an amount of data stored in the first LU is less than a predetermined threshold.

25. The data storage device of claim 18, further comprising:
means for mapping logical addresses of the first LU to physical memory of the repurposed second write buffer.

* * * * *